United States Patent
Al-Khalifah et al.

(10) Patent No.: US 12,313,571 B1
(45) Date of Patent: May 27, 2025

(54) WELLHEAD LANDING BASE INSPECTION UTILIZING X-RAYS

(71) Applicant: Saudi Arabian Oil Company, Dhahran (SA)

(72) Inventors: Hamzah A. Al-Khalifah, Al Mubarraz (SA); Fahmi Aulia, Udhailiyah (SA); AbdulHameed E. Al-Farhan, Al-Ahsa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/428,665

(22) Filed: Jan. 31, 2024

(51) Int. Cl.
| | |
|---|---|
| G01N 23/04 | (2018.01) |
| E21B 33/03 | (2006.01) |
| E21B 47/00 | (2012.01) |
| G01B 15/02 | (2006.01) |
| G01B 15/06 | (2006.01) |
| G01N 23/083 | (2018.01) |

(52) U.S. Cl.
CPC ............ *G01N 23/04* (2013.01); *E21B 47/00* (2013.01); *G01B 15/02* (2013.01); *G01B 15/06* (2013.01); *G01N 23/083* (2013.01); *E21B 33/03* (2013.01)

(58) Field of Classification Search
CPC ...... G01N 23/04; G01N 23/083; G01B 15/02; G01B 15/06; E21B 33/03; E21B 47/00
See application file for complete search history.

(56) References Cited

U.S. PATENT DOCUMENTS

| | | | | |
|---|---|---|---|---|
| 1,557,915 | A * | 10/1925 | York | E21B 35/00 166/84.5 |
| 3,461,957 | A * | 8/1969 | West | E21B 33/037 166/368 |
| 8,485,250 | B1 * | 7/2013 | Rose | E21B 43/0122 405/52 |
| 2023/0083407 | A1 * | 3/2023 | Abouhamed | B23K 26/382 175/16 |

FOREIGN PATENT DOCUMENTS

EP 2309096 A1 * 4/2011 ......... E21B 47/0006

* cited by examiner

*Primary Examiner* — Aaron L Lembo
(74) *Attorney, Agent, or Firm* — Fish & Richardson P.C.

(57) ABSTRACT

Devices and methods for wellhead landing base inspection utilizing X-rays is provided. In one aspect, a method to inspect a wellhead landing base includes forming a wellbore from a surface of the Earth to a subsurface hydrocarbon reservoir. A cellar surrounding the wellbore is formed. The cellar extends below the surface of the Earth. A conductor pipe and a surface casing are installed within the wellbore. A wellhead is installed at the surface of the Earth. A downhole end of the wellhead is connected to uphole ends of the conductor pipe and the surface casing to form a wellhead landing base that resides in the cellar. An X-ray assembly is placed inside the cellar. The X-ray assembly is oriented towards the wellhead landing base. The wellhead landing base is inspected using the X-ray assembly.

16 Claims, 2 Drawing Sheets

WELLHEAD LANDING BASE INSPECTION UTILIZING X-RAYS

TECHNICAL FIELD

The present disclosure relates to wellhead inspection.

BACKGROUND

In a hydrocarbon well, a variety of tubular or concentric casing strings are commonly deployed in a well assembly. A series of pipes or casings extend from the end of a wellhead to the subsurface reservoir. The outermost casing, known as the conductor pipe, has the largest diameter but is the shortest in length. Each subsequent inner casing has a progressively smaller diameter and an increased length. Casings can be subject to corrosions due to various factors, e.g., environmental exposure, chemical reactions, oxygen exposure, or temperature extremes. Corrosions can compromise structural integrity of casings and affect the well's control and safety. Maintaining the structural integrity at the junctions where the casings connect to the wellhead is important as it directly impacts the safety, efficiency, and overall success of well operations.

SUMMARY

The present disclosure describes methods, devices, systems and techniques for wellhead landing base inspection by a wellhead assembly utilizing X-rays.

The details of one or more implementations of the subject matter described in this specification are set forth in the accompanying drawings and the description below. Other features, aspects, and advantages of the subject matter will become apparent from the description, the drawings, and the claims.

Figure 1:
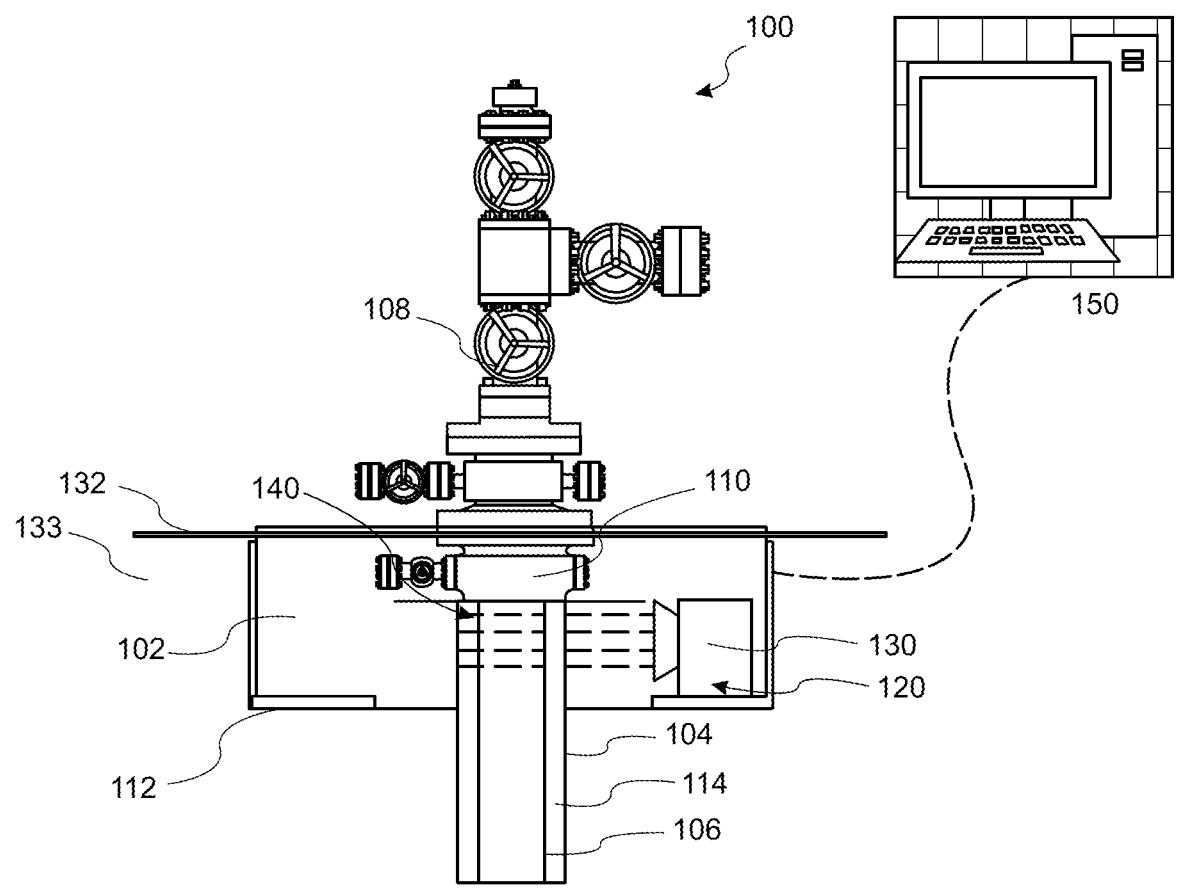
FIG. 1 is a schematic diagram of an example a well system with a wellhead assembly for wellhead landing base inspection.

It is to be understood that the various exemplary implementations shown in the figures are merely illustrative representations and are not necessarily drawn to scale.

DETAILED DESCRIPTION

Monitoring the structural integrity of the wellhead landing base is important for safeguarding the overall health of oil and gas wells. The wellhead landing base often remains in place throughout the entire lifespan of the well. Methods for evaluating the conditions of the wellhead landing base involves conducting periodic visual inspections of the wellhead landing base. This inspection aims to detect any metal loss by measuring thickness. The metal loss can result from corrosion within an approximately 6 feet below the surface, particularly inside a cellar area. The inspection methods can involve abrasive blasting, cutting, or creating openings in conductor pipe to inspect the inside surface casing and the cement within the annulus.

This disclosure describes utilizing X-rays for wellhead landing base inspection. In one aspect, a method to inspect a wellhead landing base includes forming a wellbore from a surface of the Earth to a subsurface hydrocarbon reservoir. A cellar surrounding the wellbore is formed, which extends below the surface of the Earth. A conductor pipe and a surface casing are installed within the wellbore. A wellhead is installed at the surface of the Earth. A downhole end of the wellhead is connected to uphole ends of the conductor pipe and the surface casing to form a wellhead landing base that resides in the cellar. An X-ray assembly is placed inside the cellar. The X-ray assembly is oriented towards the wellhead landing base. The wellhead landing base is inspected using the X-ray assembly.

Implementations of the present disclosure can provide one or more of the following technical advantages. For example, the techniques described here applies X-rays to inspect wellhead landing base. X-ray inspection is non-destructive. X-rays penetrate the material, allowing for a thorough examination without the need for physical damage. This non-destructive inspection preserves the integrity of the wellhead landing base and reduces the cost for extensive maintenance or repairs. Moreover, the techniques described here facilitate the detection of metal loss resulting from corrosion by measuring thickness of any component of the wellhead landing base utilizing X-rays images. The X-ray images enable inspectors to identify areas where corrosion has occurred, even in the absence of visible signs on the exterior. Another advantage of these techniques is the effectiveness in examining the condition of cement behind the conductor pipe or surface casing strings. X-ray imaging allows for a comprehensive and non-destructive assessment of the cement's condition, helping inspectors identify potential issues such as voids, cracks, or inadequate bonding. Before X-ray inspection, there is no requirement to secure the well by installing a downhole plug within the wellbore. In addition, X-ray inspection has lower safety risks compared to conventional inspection techniques like abrasive blasting or cutting. Moreover, the X-ray assembly is compact and portable which can be utilized from one well to another. This significantly reduces the inspection time per well.

FIG. 1 is a schematic diagram of an example a well system with a wellhead assembly for wellhead landing base inspection. The well system 100 includes a wellbore (not shown) from a surface 132 of the Earth 133 to a subsurface hydrocarbon reservoir. A cellar 102 is formed below a surface 132 of the Earth 133 and surrounding the wellbore. The cellar 102 is an excavated area into the ground at a drilling site, which can provide additional space for certain components of wellhead equipment for the drilling process. The cellar 102 defines an internal volume or a recessed space to accommodate the wellhead assembly 120. In some implementations, the cellar 102 is a pit excavated with square or circle shape, and the wall of the cellar 102 is supported by steel, fiber glass, or concrete. The cellar 102 enables operators to access and maintain wellhead valves, monitor annular pressure, and/or conduct inspections of the wellhead landing base.

The conductor pipe 104 is a casing string installed before any drilling operations begin and it is at least partially positioned within the cellar 102. The conductor pipe 104 can be drilled into the ground to reach a designated depth below the surface 132. It can act as a structural foundation for the well and provide stability to the wellbore. A surface casing 106, which is concentric with the conductor pipe 104, is positioned at least partially inside the conductor pipe 104. The surface casing 106 is a casing string that is cemented in place after drilling through the formations near the surface 132. The surface casing 106 can have a smaller diameter and an increased length compared to the conductor pipe 104. Like the conductor pipe 104, surface casing 106 helps stabilize the upper portion of the wellbore. The uphole portions of the conductor pipe 104 and the surface casing 106 are within the cellar 102, as illustrated in FIG. 1. The conductor pipes 104 and the surface casings 106 can be made of carbon steel or alloy steel. The conductor pipe diameter can range from 20 inches to 42 inches, while the surface casings diameter can range from 7 inches to 20 inches.

The wellhead tree 108 can be an assembly of valves, spools, and fittings that is installed on top of the well to control the flow of fluids from the wellbore. The wellhead tree 108 can be part of a wellhead. The wellhead tree 108 can serve as an interface between the subsurface well tools and the surface production facilities.

A wellhead landing base 140 resides inside the cellar 102. The wellhead landing base 140 includes the connector 110, and uphole portions of the conductor pipe 104 and surface casing 106. The uphole portions of the conductor pipe 104 and surface casing 106 are the upper segments of pipes and casings that are located within the cellar. The uphole ends of the surface casing 106 and the conductor pipe 104 can be connected to the downhole end of a wellhead, e.g., the bottom end of the wellhead tree 108, through a connector 110. The connector 110 can be below the surface 132 of the Earth 133. The connector 110 can be made of carbon steel or alloy steel and utilize flange connections on both ends. The upper flange connects to the wellhead tree 108, and the lower flange connects to the surface casing 106 and conductor pipe 104. These flanged connections can be configured to create a reliable seal to prevent any fluid or gas from escaping the well.

In some implementations, the wellhead landing base 140 includes a casing head (not shown) that provides support and a housing for the casing strings. The casing head can include a casing head spool for sealing the annular space between the casings and the wellhead. It can additionally have valves and outlets that allow for the control of pressure in the well. The wellhead landing base 140 can be in place throughout the lifespan of the well. In some implementations, the wellhead landing base 140 additionally includes a base plate or a base structure (not shown) which is utilized in conjunction with the casing head and configured to unload part of the weight of the wellhead and strings onto the conductor pipe or onto the bottom of the cellar.

Over the course of well operation, the thickness of components of the wellhead landing base can gradually reduce due to corrosion or other factors. Such change in thickness needs be monitored to ensure structural integrity of the wellhead landing base 140. Additionally, the surface casing 106 and the conductor pipe 104 define an annulus space 114. The annulus 114 can be filled with cement after the casings are in place. The cement can provide a secure bond between casings and enhance the structural integrity of the well by providing support to the casings and preventing fluid migration. The cement can develop cracks due to various factors, including fluctuations in temperature, and/or pressure change. Monitoring the cement is also an important aspect of well construction for maintaining the structural integrity.

A wellhead assembly 120 includes an X-ray subassembly 130 and a platform 112. The platform 112 is formed or positioned inside the cellar. In some implementations, the platform 112 is the bottom base of the cellar 102 which is made of sand. In some implementations, the platform 112 is a flat stage formed on the bottom base of the cellar 102. The platform 112 can be made of materials including but not limited to wood, concrete, steel, composite materials, etc. The flat surface can provide a stable foundation for tools positioned upon it. In an example, the platform 112 is formed with concrete which covers the edge region of the cellar's bottom surface surrounding the wellhead landing base 140. The platform 112 is configured to provide a steady foundation for the X-ray subassembly 130, as illustrated in FIG. 1. In some implementations, the platform 112 includes structural support elements such as steel beams and columns to provide stability to the cellar walls. Concrete can be deployed together with the steel beams and columns to reinforce the walls of the cellar against ground falling into the cellar. Although not shown, it is understood that the steel beams and columns can be positioned against the cellar walls. Such structure of the platform 112 can reduce the risk of cellar collapse.

In some implementations, the platform 112 includes parallel rails or tracks along which a tool, e.g., X-ray subassembly 130, can move. The rails can be formed the on the bottom surface of the cellar 102 surrounding the wellhead landing base 140. The rail can be made of aluminum or steel. The platform 112 can further include a dolly car which runs along the rails. The X-ray subassembly 130 can be placed on the dolly car such that the X-ray subassembly 130 can be moved around the wellhead landing base 140 to capture 360-degree X-ray images, as described with further details below.

The X-ray subassembly 130 is positioned on the platform 112 inside the cellar 102 and oriented towards the object, e.g., the wellhead landing base 140, for inspection. The X-ray subassembly 130 is configured to transmit an incident X-ray beam towards the object. The X-ray subassembly 130 then receive a response X-ray beam (also called transmitted X-ray beam) and measures light intensity of the response X-ray beam. In some implementations, the X-ray subassembly 130 includes an X-ray tube and a detector (not shown). The detector can be placed on the platform 112 on the diametrically opposite sides of the casings from X-ray tube. The X-ray tube can be configured to generate a homogenous X-ray beam (also called monochromatic beam) and/or a heterogenous X-ray beam. A monochromatic beam refers to a beam of X-ray that consists of a single, specific wavelength or frequency. In contrast, a heterogenous beam has different wavelengths or frequencies.

The X-ray passes through the objects, e.g., the wellhead landing base 140, and interacts with the internal structure of the objects. As X-rays pass through the object, they are partially absorbed by the material and attenuated. Several factors can affect the attenuation of the X-rays, including the density and thickness of the objects. The X-ray subassembly 130 captures the attenuated X-rays and converts them to electric signals. The X-ray subassembly 130 can be configured to process the electrical signals and generate an X-ray image of the wellhead landing base 140 based on the processed electrical signals.

In an implementation, the well system 100 includes a computer system 150 operatively coupled to the X-ray subassembly 130. The computer system 150 can include a computer-readable medium (e.g., a non-transitory computer-readable medium) storing computer instructions executable by one or more processors. The one or more processors can execute the stored computer instructions to perform operations described in this disclosure. The computer system 150 is located on the surface 132 of the Earth 133 and can be configured to receive signals from the X-ray subassembly 130. In one implementation, the computer system 150 receives the X-ray image from the X-ray subassembly 130 and displays the X-ray image on a screen, for example, on a computer monitor of the computer system 150. In another implementation, X-ray images are generated by the computer system 150 rather than the X-ray subassembly 130. The X-ray subassembly 130 transmits the light intensity data to the computer system 150. By processing the received data, the computer system 150 generates X-ray images. The computer system 150 can receive images or data from the X-ray subassembly 130 wirelessly or by a cable wire.

In some implementations, the computer system 150 is configured to regulate the X-ray subassembly 130 operation parameters, e.g., X-ray tube current and voltage, to improve image quality. This can be achieved by sending electric signals from the computer system 150 to the X-ray subassembly 130, wirelessly or by a cable wire.

In some implementations, the computer system 150 is configured to determine a thickness of any component of the wellhead landing base 140. The computer system 150 can use image analysis software or techniques to measure the pixel distance between the inner and outer surfaces of a component of the wellhead landing base 140 from the X-ray images. This pixel distance corresponds to the actual thickness of the component. In an example, an edge algorithm is utilized to identify the boundaries of a conductor pipe 104 by highlighting sudden changes in intensity, which is corresponding to material boundaries. The computer system 150 then extracts cross-sectional intensity profiles along lines perpendicular to the pipe's axis and obtain pixel distance. The pixel distance can be converted into an actual physical distance by referring to a database which stores a relationship between pixel values and actual physical distance. The database can be stored in the non-transitory computer-readable medium of the computer system 150. The database can include a table, or another suitable data structure. In the implementation using a table, it can have, for example, multiple rows and columns where each row has at least a first column to represent a pixel distance and a corresponding second column to represent an actual physical distance. The computer compares the measured pixel distance to each row in the column of the pixel distance until it matches. From there, the actual physical distance, e.g., the thickness for the casings or pipes, can be determined by accessing an associated column of the selected row.

In some implementations, the computer system 150 is configured to detect presence or absence of a deformation of any component of the wellhead landing base 140. In an example, the computer system 150 stores a reference image of any component of the wellhead landing base 140 in its undeformed state. This reference image is used for comparison with the X-ray images to identify any deformations. The comparison process can involve identifying and analyzing the contours or outlines of objects in X-ray image and the reference images. Changes in contour shapes, irregularities, or missing segments can indicate areas of deformation. In another example, a digital subtraction radiography (DSR) is deployed which subtracts the reference image from the measured X-ray image pixel by pixel. The resulting image highlights regions where deformations have occurred.

In some implementations, the computer system 150 determines whether the extent of deformation exceeds a predetermined threshold. In response to determining that the extent of deformation exceeding the threshold, the computer system 150 sends signals to a well equipment, e.g., a wellhead tree 108, to modify or cease wellbore operations. In some implementations, once a deformation is detected, the computer system 150 raises an alert to operators indicating the deformation. Alerts can be an email notification, a text message, or a pop-up window on a screen. The alert can include information pertaining to the location and dimensions of the deformation and recommended follow-up actions. The alert can also indicate there is no deformation detected.

In some implementations, the X-ray subassembly 130 is configured to inspect the cement inside the annulus space 114. The X-ray images can be utilized to detect the presence or absence of cracks in the cement. The cracks can appear as dark lines or irregularities in the X-ray images. In some implementations, the computer system 150 measures the dimensions, e.g., length, of cracks based on X-ray images and compares the measured dimensions with a pre-determined threshold. If the crack dimensions exceed the pre-determined threshold, the computer system 150 can send signals to a well equipment, e.g., a wellhead tree 108, to modify or cease wellbore operations. The computer system 150 can also raise an alert to operators for remedial actions. The methodology or software employed for measuring crack dimensions can be identical or similar to the techniques for thickness measurement and/or deformation detection described above.

In some implementations, the X-ray subassembly 130 is configured to generate multiple X-ray images of the wellhead landing base 140 at multiple angles. Each X-ray image is two-dimensional (2D) X-ray image or projection associated with a respective angle. In an example, the X-ray subassembly 130 is configured to move around the wellhead landing base 140 using the rails and the dolly car described above. A full 360-degree rotation can be performed to capture X-ray images from multiple angles. At each rotation angle, the object, e.g., the wellhead landing base 140, is exposed to X-rays. The X-rays penetrate the object, and the X-ray subassembly 130 records the intensity of X-rays that pass through the object for each angle.

Figure 2:
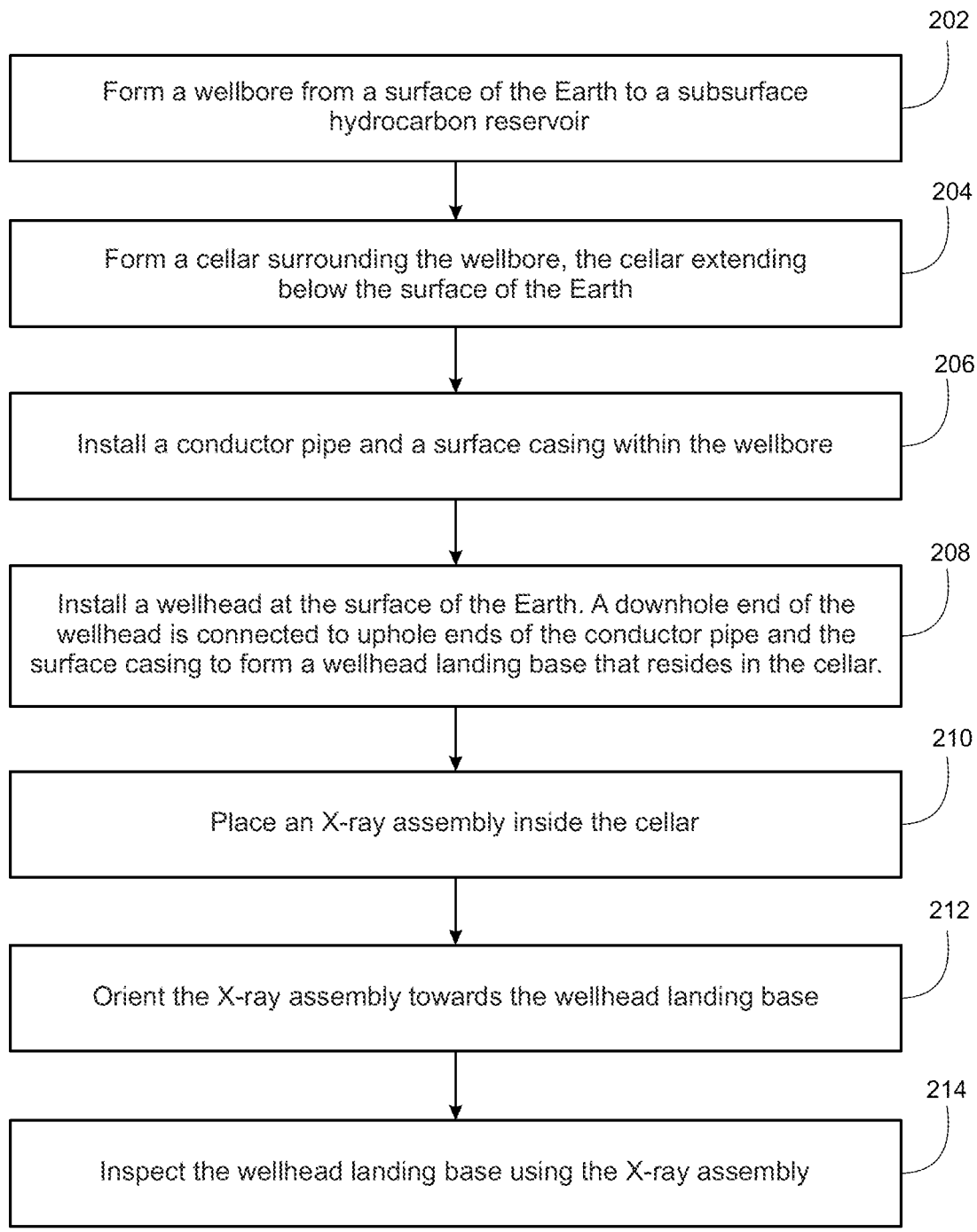
FIG. 2 is a flow chart of an example process.

FIG. 2 is a flow chart of an example process. At step 202, a wellbore is formed from a surface of the Earth to a subsurface hydrocarbon reservoir.

At step 204, a cellar is formed surrounding the wellbore and extends below the surface of the Earth. The cellar can be the cellar 102 described in FIG. 1.

At step 206, a conductor pipe and a surface casing are installed within the wellbore. As illustrated in FIG. 1, the uphole portions of the conductor pipe 104 and the surface casing 106 are located within the cellar 102.

At step 208, a wellhead is installed at the surface of the Earth. A downhole end of the wellhead is connected to uphole ends of the conductor pipe and the surface casing to form a wellhead landing base that resides in the cellar.

At step 210, an X-ray assembly, e.g., the X-ray subassembly 130 in FIG. 1, is placed inside the cellar.

At step 212, the X-ray assembly is oriented towards the wellhead landing base.

At step 214, the X-ray assembly is utilized to inspect the wellhead landing base. As described above in FIG. 1, the X-ray assembly can generate X-ray images. The X-ray images can be utilized to determine a thickness of any component of the wellhead landing base 140. The components of the wellhead landing base include without limitation the uphole portions of the conductor pipe and the surface casing, and the connector between the casings and the wellhead tree. The X-ray images can also be used to detect the presence or absence of a deformation on any component of the wellhead landing base 140.

Implementations

Certain aspects of the subject matter described here can be implemented as a method of inspecting a wellhead landing base. The method includes forming a wellbore from a surface of the Earth to a subsurface hydrocarbon reservoir.

A cellar surrounding the wellbore is formed. The cellar extends below the surface of the Earth. A conductor pipe and a surface casing are installed within the wellbore. A wellhead is installed at the surface of the Earth. A downhole end of the wellhead is connected to uphole ends of the conductor pipe and the surface casing to form a wellhead landing base that resides in the cellar. An X-ray assembly is placed inside the cellar. The X-ray assembly is oriented towards the wellhead landing base. The wellhead landing base is inspected using the X-ray assembly.

An aspect combinable with any other aspect includes the following features. The method further includes forming a platform inside the cellar. The X-ray assembly is positioned on the platform.

An aspect combinable with any other aspect includes the following features. The downhole end of the wellhead is connected to the uphole ends of the conductor pipe and the surface casing through a connector.

An aspect combinable with any other aspect includes the following features. Inspecting the wellhead landing base using the X-ray assembly includes generating an X-ray image of the wellhead landing base.

An aspect combinable with any other aspect includes the following features. The method includes sending signals to a computer system positioned on the surface of the Earth.

An aspect combinable with any other aspect includes the following features. The method includes determining a thickness of a component of the wellhead landing base based on the X-ray image.

An aspect combinable with any other aspect includes the following features. The method includes detecting a deformation of a component of the wellhead landing base based on the X-ray image.

An aspect combinable with any other aspect includes the following features. The method includes generating a plurality of two-dimensional (2D) X-ray images of the wellhead landing base at a plurality of angles. Each of the plurality of 2D X-ray images is associated with a respective angle of the plurality of angles.

An aspect combinable with any other aspect includes the following features. The method includes inspecting cement in an annulus space between the surface casing and the conductor pipe.

Certain aspects of the subject matter described here can be implemented as a wellhead assembly configured to inspect a wellhead landing base. A wellhead assembly includes a platform inside a cellar below a surface of the Earth. The wellhead assembly also includes an X-ray subassembly positioned on the platform inside the cellar and oriented towards a wellhead landing base that resides in the cellar. The X-ray subassembly is configured to transmit an incident X-ray beam towards the wellhead landing base, receive a response X-ray beam and measure light intensity of the response X-ray beam. The wellhead landing base includes uphole portions of a conductor pipe and a surface casing.

An aspect combinable with any other aspect includes the following features. The X-ray subassembly is configured to be movable on the platform around the wellhead landing base.

An aspect combinable with any other aspect includes the following features. The X-ray subassembly is configured to generate an X-ray image of the wellhead landing base.

An aspect combinable with any other aspect includes the following features. The wellhead assembly includes a computer system operatively coupled to the X-ray subassembly. The computer system is configured to receive signals from the X-ray subassembly.

An aspect combinable with any other aspect includes the following features. The computer system is configured to determine a thickness of a component of the wellhead landing base.

An aspect combinable with any other aspect includes the following features. The computer system is configured to detect a deformation of a component of the wellhead landing base.

An aspect combinable with any other aspect includes the following features. The X-ray subassembly is configured to generate a plurality of X-ray images of the wellhead landing base at a plurality of angles. Each of the plurality of X-ray images is associated with a respective angle of the plurality of angles.

Certain aspects of the subject matter described here can be implemented as a method to inspect a wellhead landing base. The method includes placing an X-ray assembly inside a cellar surrounding a wellbore. The wellbore is formed from a surface of the Earth to a subsurface hydrocarbon reservoir. The cellar extends below the surface of the earth. A conductor pipe and a surface casing are installed within the wellbore. A wellhead is installed at a surface of the Earth. A downhole end of the wellhead is connected to uphole ends of the conductor pipe and the surface casing to form a wellhead landing base that resides in the cellar. The method also includes orienting the X-ray assembly towards the wellhead landing base and inspecting the wellhead landing base using the X-ray assembly.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous. Moreover, aspects described with reference to any figure or any implementation can be combined with aspects described with any other figure or any other implementation.

The invention claimed is:

1. A method, comprising:
   forming a wellbore from a surface of the Earth to a subsurface hydrocarbon reservoir;
   forming a cellar surrounding the wellbore, the cellar extending below the surface of the Earth;
   installing a conductor pipe and a surface casing within the wellbore;
   installing a wellhead at the surface of the Earth, a downhole end of the wellhead connected to uphole ends of the conductor pipe and the surface casing to form a wellhead landing base that resides in the cellar;
   placing an X-ray assembly inside the cellar;
   orienting the X-ray assembly towards the wellhead landing base; and
   inspecting the wellhead landing base using the X-ray assembly.

2. The method of claim 1, further comprising forming a platform inside the cellar, wherein the X-ray assembly is positioned on the platform.

3. The method of claim 1, wherein the downhole end of the wellhead is connected to the uphole ends of the conductor pipe and the surface casing through a connector.

4. The method of claim 1, wherein inspecting the wellhead landing base using the X-ray assembly comprises: generating an X-ray image of the wellhead landing base.

5. The method of claim 1, comprising sending signals to a computer system positioned on the surface of the Earth.

6. The method of claim 4, comprising determining a thickness of a component of the wellhead landing base based on the X-ray image.

7. The method of claim 4, comprising detecting a deformation of a component of the wellhead landing base based on the X-ray image.

8. The method of claim 1, comprising generating a plurality of two-dimensional (2D) X-ray images of the wellhead landing base at a plurality of angles, each of the plurality of 2D X-ray images associated with a respective angle of the plurality of angles.

9. The method of claim 1, comprising inspecting cement in an annulus space between the surface casing and the conductor pipe.

10. A wellhead assembly, comprising:
 a platform inside a cellar below a surface of the Earth; and
 an X-ray subassembly positioned on the platform inside the cellar and oriented towards a wellhead landing base that resides in the cellar, the X-ray subassembly configured to transmit an incident X-ray beam towards the wellhead landing base, receive a response X-ray beam and measure light intensity of the response X-ray beam, the wellhead landing base comprising uphole portions of a conductor pipe and a surface casing,
 wherein the X-ray subassembly is configured to be movable on the platform around the wellhead landing base.

11. The wellhead assembly of claim 10, wherein the X-ray subassembly is configured to generate an X-ray image of the wellhead landing base.

12. The wellhead assembly of claim 10, further comprising a computer system operatively coupled to the X-ray subassembly, the computer system configured to receive signals from the X-ray subassembly.

13. The wellhead assembly of claim 12, wherein the computer system is configured to determine a thickness of a component of the wellhead landing base.

14. The wellhead assembly of claim 12, wherein the computer system is configured to detect a deformation of a component of the wellhead landing base.

15. The wellhead assembly of claim 10, wherein the X-ray subassembly is configured to generate a plurality of X-ray images of the wellhead landing base at a plurality of angles, each of the plurality of X-ray images associated with a respective angle of the plurality of angles.

16. A method to inspect a wellhead landing base, the method comprising:
 placing an X-ray assembly inside a cellar surrounding a wellbore, the wellbore formed from a surface of the Earth to a subsurface hydrocarbon reservoir, the cellar extending below the surface of the earth, a conductor pipe and a surface casing installed within the wellbore, a wellhead installed at a surface of the Earth, a downhole end of the wellhead connected to uphole ends of the conductor pipe and the surface casing to form a wellhead landing base that resides in the cellar;
 orienting the X-ray assembly towards the wellhead landing base; and
 inspecting the wellhead landing base using the X-ray assembly.

* * * * *